July 26, 1955 — G. W. SHIRLEY — 2,713,834

SUB-IRRIGATION AND FERTILIZING DEVICE

Filed May 25, 1954

INVENTOR.
GUY W. SHIRLEY
BY
Martin E. Anderson
ATTORNEY

United States Patent Office 2,713,834
Patented July 26, 1955

2,713,834

SUB-IRRIGATION AND FERTILIZING DEVICE

Guy W. Shirley, Denver, Colo.

Application May 25, 1954, Serial No. 432,167

2 Claims. (Cl. 111—7.1)

This invention relates to improvements in combined sub-irrigating and fertilizer applying devices and which is designed particularly for use with soluble plant foods of the kind now quite generally available.

Residents in cities who have houses positioned on lots of sufficient size are always desirous of raising flowering shrubs, roses and similar plants and also have fruit and/or shade trees and as a rule any irrigation that is practiced consists in a moderate surface sprinkling which does not penetrate sufficiently to provide sufficient sub-soil moisture for a vigorous root structure.

It is the object of this invention to produce a novel apparatus of such design and construction that by its use the irrigation water can be released below the surface of the ground among the roots and rootlets and so that the ground will become moist at a sufficient depth to produce a deep root structure.

Another object is to produce a device of such construction that it can be used for depositing a plant food or fertilizer solution into the soil at a depth that brings it into close contact with the roots.

Having thus set out the principal objects of the invention the means by which the objects are attained will now be described in detail for which purpose reference will now be had to the accompanying drawing in which the invention is illustrated, and in which, Figure 1 is a vertical diametrical section taken on line 1—1, Figure 2;

Figure 2:
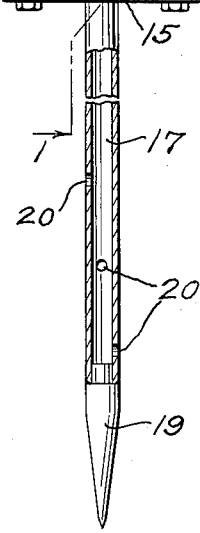
Figure 2 is an elevational view looking towards the left in Figure 1.
Figure 4:
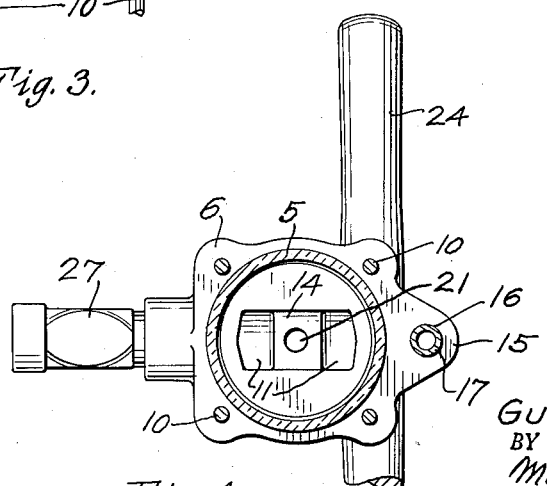
Figure 4 is a section taken on line 4—4, Figure 1.

Referring now to the drawing, numeral 5 designates a short tube of transparent plastic such as "Lucite" but it may be made from ordinary glass if desired. The ends of the tube are closed by a top 6 and a bottom 7. The upper surface of the bottom and the under surface of the top are each provided with a circular groove 8 in the bottom of which an elastic sealing washer 9 is positioned. The top and the bottom are joined by four bolts 10 that serve to hold the parts in assembled relation. The top has an opening 11 that terminates at one end in a threaded section 12 and at the other end in a solid wall 13. A large opening 14 communicates opening 11 with the interior of the cylindrical container. The top and the bottom are both provided with a lateral projection. The one of the bottom has been designated by numeral 15 and has a hole 16 through which pipe 17 extends. The part of the top that corresponds to 15 of the bottom has been designated by 13 and has the lower wall provided with a threaded hole 18 for the reception of the threaded upper end of pipe 17. The lower end of pipe 17 is closed by a tapered plug 19 and the pipe is provided near its lower end with a plurality of small holes 20. The top has a central threaded opening 21 with which the stopcock 22 is connected. The upper surface of the top has a transversely arcuate depression 23 in which handle 24 rests. Two of the bolts 10 have long threaded sections at their upper ends and project through holes in the handle which is then secured in place by double nuts 25. Other nuts 26 engage the upper surface of the top as shown in Figure 2. A stopcock 27 has one end threaded into opening 11 and the other end connected with the garden hose 28. Numeral 29 represents the handle of stopcock 27.

Figure 1:
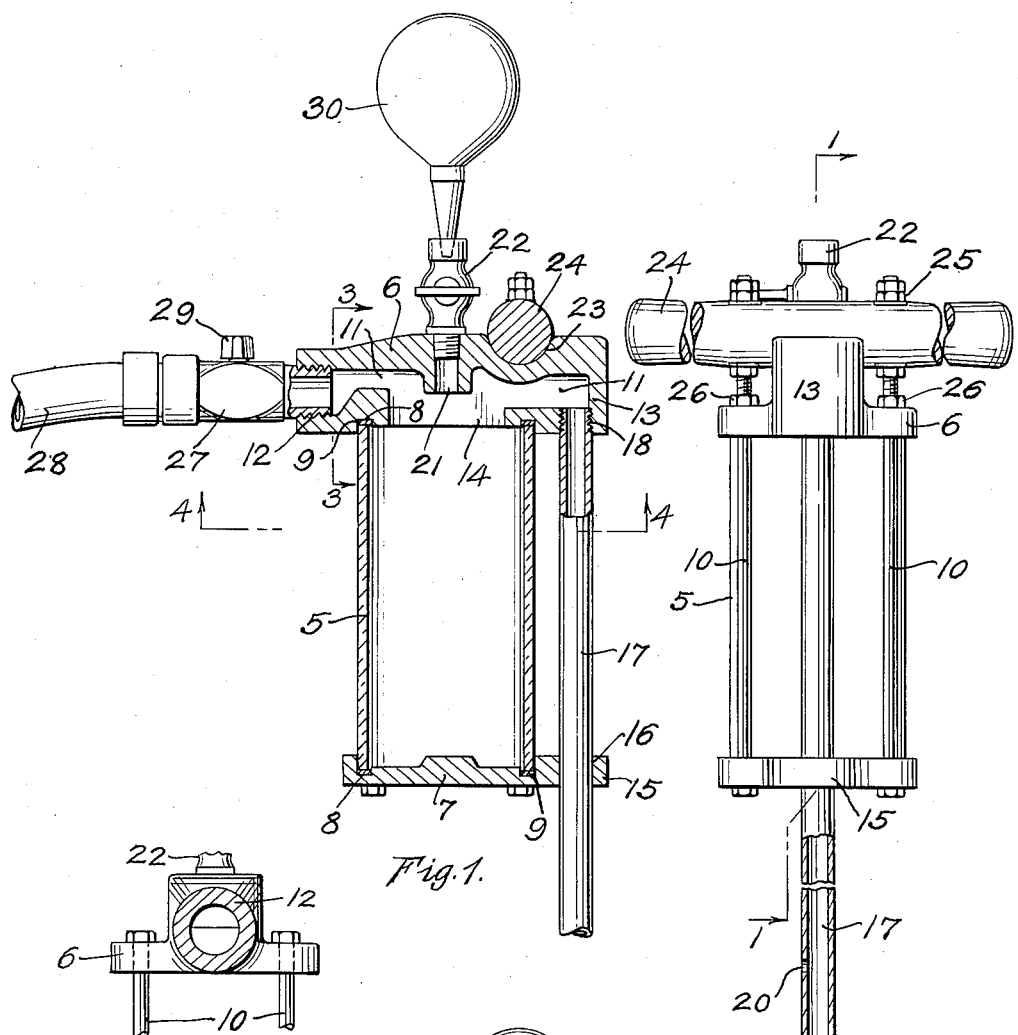
Figure 3:
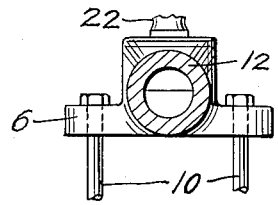
Figure 3 is a section taken on line 3—3, Figure 1.

A rubber syringe 30 is shown in Figure 1 as positioned with its tip positioned in the top of stopcock 22 which position is occupied by it in introducing a concentrated liquid fertilizer into the container as will be hereinafter described.

Let us now assume that the device above described is connected with a water supply through hose 28 and that it is desired to irrigate and supply fertilizer to the roots of a rose bush or the like. Stopcock 29 is closed before the water is turned into hose 28. Stopcock 22 must also be closed. Stopcock 29 is now opened and water flows into the tube and finally into pipe 17 and out through holes 20. The pressure of the water is regulated by stopcock 29 so that the water will squirt out through holes 20 for a distance of one foot or more. The operator now grasps handle 24 and exerts a downward pressure forcing point 19 into the ground. Since water is flowing out through holes 20 the pipe can readily be inserted into the ground to the depth desired. After the desired depth has been reached stopcock 29 may be further opened and as much water as desired discharged among the roots. If it is desired to introduce a liquid fertilizer stopcock 29 is closed and the parts are allowed to remain for some minutes. The siphon action will lower the level of the liquid slightly and stopcock 22 is then opened and the concentrated fertilizer solution is introduced by means of the bulb syringe 30 after which stopcock 22 is closed and stopcock 29 opened. The water is then permitted to flow until the fertilizer has all been transferred to the soil. Stopcock 29 is then closed and the pipe withdrawn. The spray from openings 20 can be used for limited surface irrigation if desired.

What I claim as new is:

1. A device for supplying water and plant food to the roots of plants, shrubs, trees and the like comprising in combination, a tube, top and bottom closures in sealing relation with the ends of said tube, said closures having aligned openings, a plurality of bolts extending through said aligned openings for securing said closures in sealing engagement with the ends of the tube, the top closure having a diametrical opening extending entirely across the tube terminating in a wall, said top closure having an enlarged opening communicating the interior of the tube with the diametrical opening, the top closure having a threaded opening in communication with the diametrical opening at a point beyond the tube, the bottom closure having a hole in alignment with said threaded opening in the top closure, an elongated tubular nozzle extending through the hole in the bottom closure and threadedly connecting the threaded opening in the top closure, the lower end of the nozzle being closed by a tapering plug, the wall of the nozzle above the plug having a plurality of spray openings, the top closure having a central aperture in communication with the diametrical opening, and a valve device associated with said aperture for controlling a flow of material therethrough to the diametrical opening.

2. A device in accordance with claim 1 in which the upper surface of the top closure has an elongated depression for the reception of a handle, the depression extending over two of the closure securing bolts, said bolts extending through the handle forming means for rigidly attaching the handle to the reservoir.

References Cited in the file of this patent

UNITED STATES PATENTS

| | | |
|---|---|---|
| 1,582,225 | Pulkinghorn | Apr. 27, 1926 |
| 2,214,083 | Lester | Sept. 10, 1940 |
| 2,242,789 | McFee | May 20, 1941 |
| 2,293,390 | Hengesbach | Aug. 18, 1942 |
| 2,302,799 | Peterson | Nov. 24, 1942 |